United States Patent [19]

Bloem et al.

[11] Patent Number: 5,774,655

[45] Date of Patent: Jun. 30, 1998

[54] METHOD AND APPARATUS FOR DISPLAYING MULTIPLE REPRESENTATIONS OF CONNECTIONS IN A COMMUNICATIONS NETWORK WITH DIFFERING LEVELS OF DETAIL

[75] Inventors: Jacobus Johannes Bloem, The Hague; Harrold Bastiaan Korte, Voorschoten, both of Netherlands

[73] Assignee: Koninklijke PTT Nederland N.V., Netherlands

[21] Appl. No.: 852,726

[22] Filed: May 7, 1997

Related U.S. Application Data

[63] Continuation of Ser. No. 504,889, Jul. 20, 1995, abandoned.

[30] Foreign Application Priority Data

Jul. 22, 1994 [EP] European Pat. Off. .............. 94202151

[51] Int. Cl.⁶ ..................................................... H04J 12/00
[52] U.S. Cl. .................................. 395/200.5; 395/200.53; 395/200.57; 395/200.4
[58] Field of Search .................... 340/825.06, 825.17; 364/188; 370/252, 254; 395/335, 356, 183.22, 200.01, 200.1, 200.11, 200.12, 835, 200.5, 200.51, 200.52, 200.53, 200.54, 200.57, 200.58, 2

[56] References Cited

U.S. PATENT DOCUMENTS

| | | | |
|---|---|---|---|
| 5,049,873 | 9/1991 | Robins et al. | 340/825.06 |
| 5,136,690 | 8/1992 | Becker et al. | 395/161 |
| 5,226,120 | 7/1993 | Brown et al. | 395/200.11 |
| 5,261,044 | 11/1993 | Dev et al. | 395/159 |
| 5,276,789 | 1/1994 | Besaw et al. | 395/140 |
| 5,295,244 | 3/1994 | Dev et al. | 395/161 |
| 5,353,399 | 10/1994 | Kuwamoto et al. | 395/159 |
| 5,394,522 | 2/1995 | Sanchez-Frank et al. | 395/349 |
| 5,436,909 | 7/1995 | Dev et al. | 395/182.02 |
| 5,452,415 | 9/1995 | Hotka | 395/161 |
| 5,471,399 | 11/1995 | Tanaka et al. | 364/491 |
| 5,493,568 | 2/1996 | Sampat et al. | 370/60 |
| 5,500,929 | 3/1996 | Dickinson | 395/160 |
| 5,500,934 | 3/1996 | Austin et al. | 395/155 |
| 5,504,921 | 4/1996 | Dev et al. | 395/800 |

FOREIGN PATENT DOCUMENTS

| | | |
|---|---|---|
| 0490624 | 6/1992 | European Pat. Off. . |
| 0499567 | 8/1992 | European Pat. Off. . |
| WO9205485 | 4/1992 | WIPO . |

OTHER PUBLICATIONS

R.J. Cysper, Communications for Cooperating Systems, OSI, SNA, and TCP/IP, Addison–Wesley, pp. 79, 89, 105, 1991.

William Stallings, Local and Metropolitan Area Networks, 4th ed., Prentice Hall, pp. 167, 477, 510. TK 5105.7.s77, 1993.

Feiner, Steven et al. "A Virtum World For Network Management," in Proceedings of 1993 Int'l. Symposium on Virtum Reality, pp. 55–61.

Primary Examiner—Lance Leonard Barry, Esq.
Attorney, Agent, or Firm—Michaelson & Wallace; Peter L. Michaelson

[57] ABSTRACT

The invention relates to a method of providing connections in a communications network, a connection being set up by a server in response to a service request from a client, the method comprising the steps of providing a representation of a connection corresponding to the respective service request, and of establishing the connection on the basis of the representation. According to the invention the method is characterized in that the representation comprises at least two levels of abstraction. This provides the possibility for the client to choose and manipulate a suitably detailed representation of the connection. Preferably, only the representation having the highest level of abstraction is initially offered to the client, the other representation or representations only being presented upon subsequent client request.

7 Claims, 3 Drawing Sheets

METHOD AND APPARATUS FOR DISPLAYING MULTIPLE REPRESENTATIONS OF CONNECTIONS IN A COMMUNICATIONS NETWORK WITH DIFFERING LEVELS OF DETAIL

CROSS REFERENCE TO RELATED APPLICATION

This application is a continuation of co-pending patent application entitled "Method of Providing Representations of Connections in a Communications Network", application Ser. No. 08/504,889, filed on Jul. 20, 1995 now abandoned.

BACKGROUND OF THE INVENTION

The present invention relates to a method of providing connections in a communications network, a connection being set up by a server in response to a service request from a client, the method comprising the steps of providing a representation of a connection corresponding to the respective service request, and establishing the connection on the basis of the representation. Methods of this kind are known in practice.

In communications systems, use is made of clients and servers to establish connections. A client, which may be a device or a process for providing services to end users, generates a service request in response to an actuation by an end user and passes the service request to a server. The server, which may be a device or a process for providing connections in response to service requests, presents to the client a model representing the connection sought. On the basis of this model or representation the server establishes the connection, while the client may further specify or readjust the service request on the basis of the representation provided by the server. As most clients do not need, nor are able to handle, detailed information with regard to the connection, the representation offered by most prior art methods only provides the bare essentials of the connection sought. This is clearly unsatisfactory when a client wishes to alter the service request because of, for example, changed needs. On the other hand, some other prior art methods use representations providing more detail than necessary for most applications, thus needlessly cluttering the client with information. This leads to a longer processing time of the service requests and a more complex structure of the clients.

Prior Art document WO 92/05485 (reference [5]) describes a network management system in which models representing network entities are visually presented to a particular user. Such a system requires the active participation of a user, whereas the present invention is primarily directed at fully automated systems in which the individual user may not be aware of the interactions between clients and servers. This Prior Art document therefore does not offer a suitable representation at the client-server interface.

SUMMARY OF THE INVENTION

It is an object of the present invention to eliminate the disadvantages of the prior art and to provide a more flexible method of providing connections in a communications network. It is a further object of the present invention to provide a representation of a connection adjustable to the needs of the particular client. It is a still further object of the invention to provide a representation of a connection, the information content of which can be selected by the particular client.

To this and other ends, the method according to the invention is characterized in that the representation comprises at least two levels of abstraction which are alternatively available to the client. In other words, two or more associated representations are generated, each representation corresponding to a different level of abstraction of the connection sought. This offers the advantage that different representations are available for different applications. A client needing detailed information on the connection, e.g. regarding the required bandwith, error rate, etc., may be presented a representation at a low level of abstraction, thus offering a substantial amount of information. A client having no specific needs may be presented a representation at a high level of abstraction, thus offering a limited amount of information. It will be understood that more gradations with respect to the amount of information can be offered as more levels of abstraction, i.e. more alternative representations at the respective levels, are generated.

Preferably, two different levels of abstraction are provided. In this way, a substantial flexibility of representation is obtained through a minimum amount of complexity and processing. However, three, four, five or even more different levels of abstraction may be provided.

Advantageously, two illustrative levels of abstraction are alternatively available to the client. In other words, only one representation is offered to the client, while the client may select the level of abstraction most suitable for its current needs. The system, i.e. usually the server, generates the two illustrative representations and offers the representations as alternatives to the client.

Still more advantageously, initially only the representation having the highest level of abstraction is offered to the client, the other representation or representations only being presented upon request, i.e. upon a suitable request from the client.

Preferably, the representation on a first level comprises ports representing origins and destinations, and lines representing the connectivity between ports, while the representation at a second level preferably comprises sources representing origins, sinks representing destinations, and flows representing the connectivity between sources and sinks. In this way, meaningful representations can be made, providing an appropriate amount of information at the respective levels.

Advantageously, the representations are obtained through object-oriented modelling. An implementation of the method can in that case be realized using object-oriented programming. The principles of object-oriented modelling and programming are disclosed in, i.a., reference [1].

The inventive idea is not limited to establishing connections in a communications network, but also relates to a method of representing connections in general. The invention is, however, especially useful in providing so-called on-demand connections for e.g. telephone calls or multimedia conferencing.

The invention further provides a communications network, as well as a server, arranged for applying the method discussed above. Such a communications network is provided with servers adapted to provide representations at different levels of abstraction.

REFERENCES

[1] Rumbaugh, J.: "Object-oriented programming", Englewood Cliffs, N.J., 1991.

[2] Tanenbaum, A. S.: "Computer Networks", Englewood Cliffs, N.J., 1988.

[3] ISO/IEC Recommendation X.903: "ODP Reference Model: Prescriptive Model", 1994

[4] ITU Recommendation X.700: "Management framework for open systems interconnection for CCITT applications".

[5] WO 92/05485

These references are herewith incorporated by reference into this text.

BRIEF DESCRIPTION OF THE DRAWING

The invention will now be further explained with reference to the accompanying drawing, in which.

DETAILED DESCRIPTION OF THE DRAWING

Figure 1:
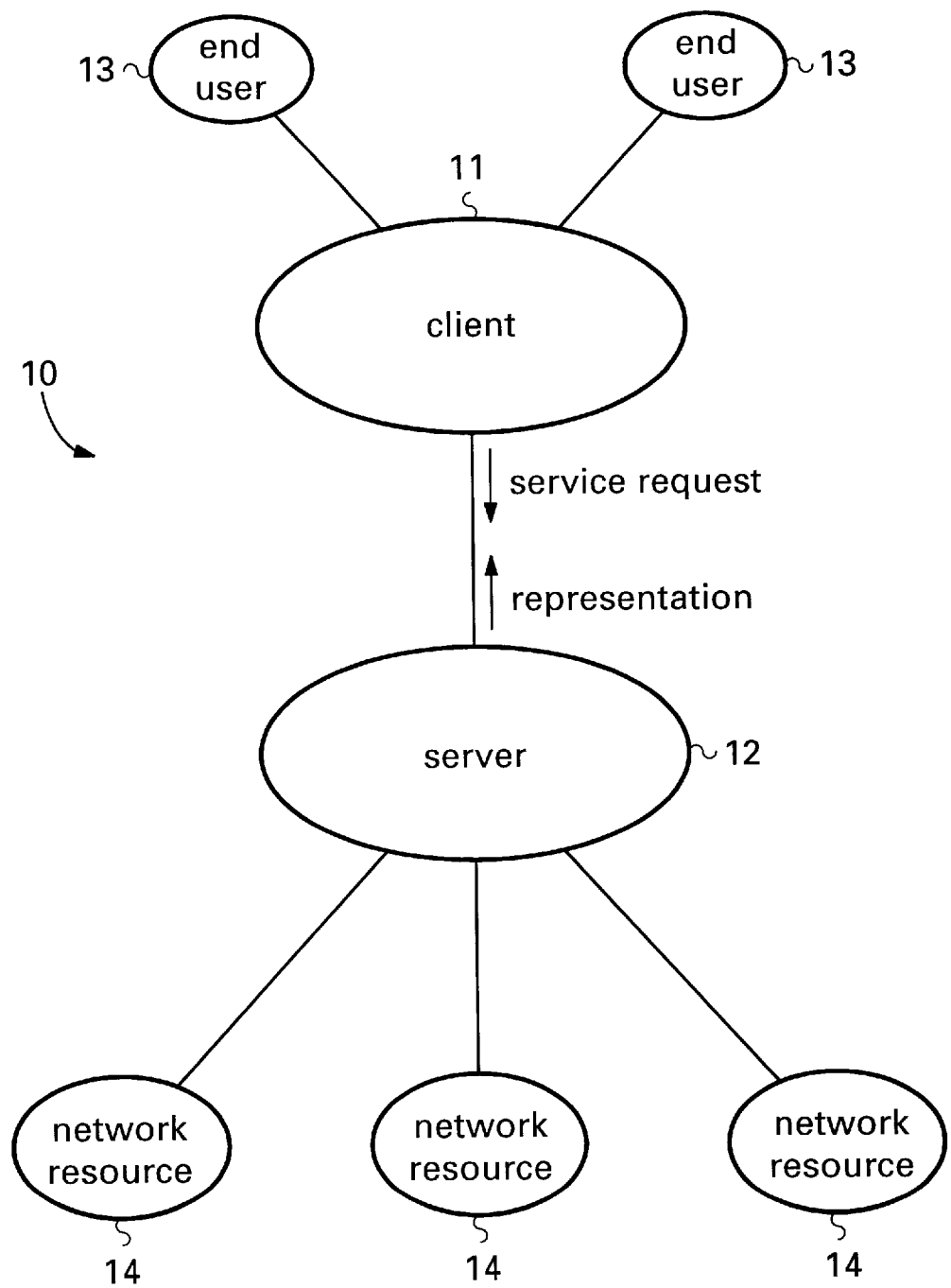
FIG. 1 shows schematically a communications network in which the invention may be applied.

FIG. 1 shows a schematic representation of a communications network 10, comprising a client 11, a server 12, end users 13 and network resources 14. The end users 13 are coupled with the client 11 and are capable of generating actuation signals indicating that they require a service, such as a connection. The client 11 handles the actuation signals and generates, when appropriate, suitable service requests which are sent to the server 12. The relationship between the client 11 and the server 12 is a specific one, in the sense that the client 11 behaves as a manager and that the server behaves as an agent for the network resources. Such a manager-agent relationship is described in e.g. [4].

In response to a service request, the server 12 generates a representation of the service requested, i.e. a connection. This representation is described in terms of managed objects (see [4]). On the basis of the representation the server 12 establishes a suitable connection by means of network resources 14, which may include switches. The representation is offered to the client 11, thus enabling the client 11 to check the connections and make requests for adjustments when necessary. The client 11 thus represents a (tele) communications service, whereas the server 12 is a reusable function with the purpose of establishing connections in communications networks while hiding the details of these networks from clients.

It will be understood that the communications network 10 may comprise further elements, which are not shown in FIG. 1 for the sake of clarity.

Figure 2:
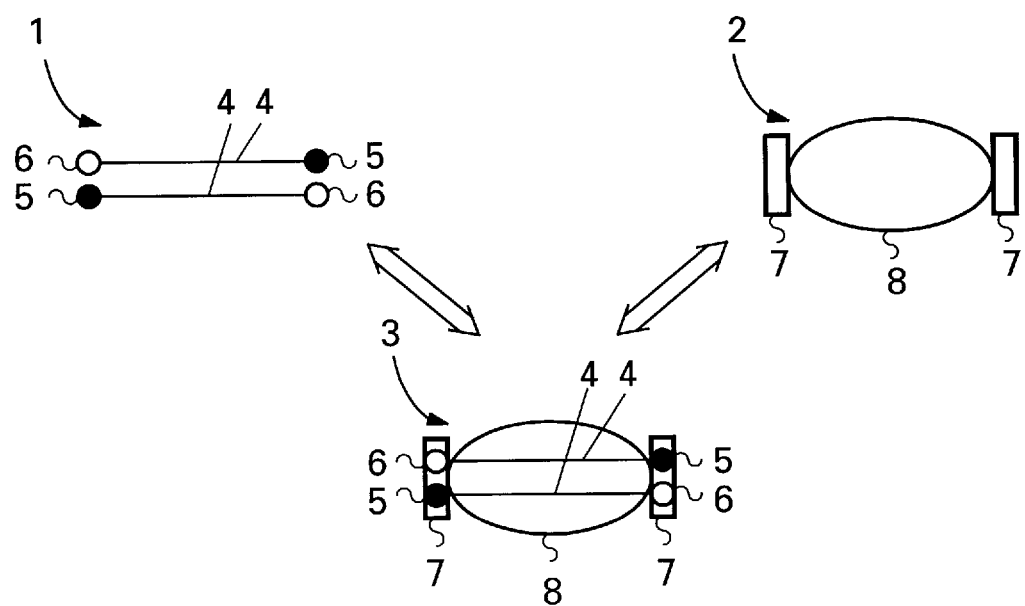
FIG. 2 shows schematically different representations according to the invention.

FIG. 2 shows schematically different representations of a single connection, such as the connection discussed above with reference to FIG. 1. Representation 1 is a representation showing flows 4, sinks 5 and sources 6. In this context, a source 6 is understood to represent the resources in a terminal involved in the production and transportation of information, while a sink 5 represents the resources in a terminal involved in the consumption and transportation of information. A flow 4 represents the resources in a communications network that are involved in the transportation of information between terminals. A terminal is understood to represent the apparatus used by an end user to communicate with the network.

The representation 1 allows the client to make adjustment to the specification, i.e. to the service request of the connection, for example by altering or further specifying the capacity of a flow, specifying alternative or additional sources and/or sinks, etc.

Representation 2 comprises ports 7 and a line 8. A port 7 represents a group of sources and sinks, and a line 8 represents a group of flows (cf. representation 1). It is clear from FIG. 2 that representation 2 provides less detail with respect to the particular connection. This is an advantage when the particular client requires little information, but a disadvantage when the client wants to closely monitor the connection and, possibly, wants to alter its specification.

In accordance with the present invention a combined or aggregate representation is generated, such as the representation 3 in FIG. 2. This representation 3 comprises, in the example shown in FIG. 2, flows 4, sinks 5, sources 6, ports 7 and a line 8. In other words, the representation 3 comprises all the elements of the representations 1 and 2. Although the representation 3, or a similar aggregate representation, is generated in response to a service request, only one of the representations 1 or 2 is offered to the client, thus limiting the amount of information transferred. Preferably, the representation 2 is the default representation offered to the client, this representation corresponding with the highest level of abstraction and constituting the minimum amount of information.

As a result of the multiple representation, the client can request connectivity on at least two levels of abstraction.

In response to a service request the server builds an internal representation of the connection. Regardless of the chosen abstraction level the server builds up the entire model incorporating all abstraction levels (1 and 2 in FIG. 2). So, if the client wishes to specify connections in an abstract way, i.e. without detail, it specifies ports 7 and lines 8. The client leaves it for the server to determine the actual sources and sinks to be selected and connected by flows. The sources, sinks and flows will be created (instantiated) but the client will not be notified of this. The transparent instantiation (to the client) of these objects allows the client in a later phase to change from representation (view) 2 to representation 1. It could decide to do this when it wants to modify the connection on a more detailed level. The client could switch views by requesting the server to give more information on the actual instantiated objects.

The ports 7 and lines 8 depicted in FIG. 2 are, just as the flows 4, sinks 5 and sources 6, preferably modelled as objects used in the communication (exchange of information) between a client and a server. The purpose of this communication is for the client to request the server to establish one or more connections in the communications network. The client-server communication is further described in references [2] and [4].

Figure 3:
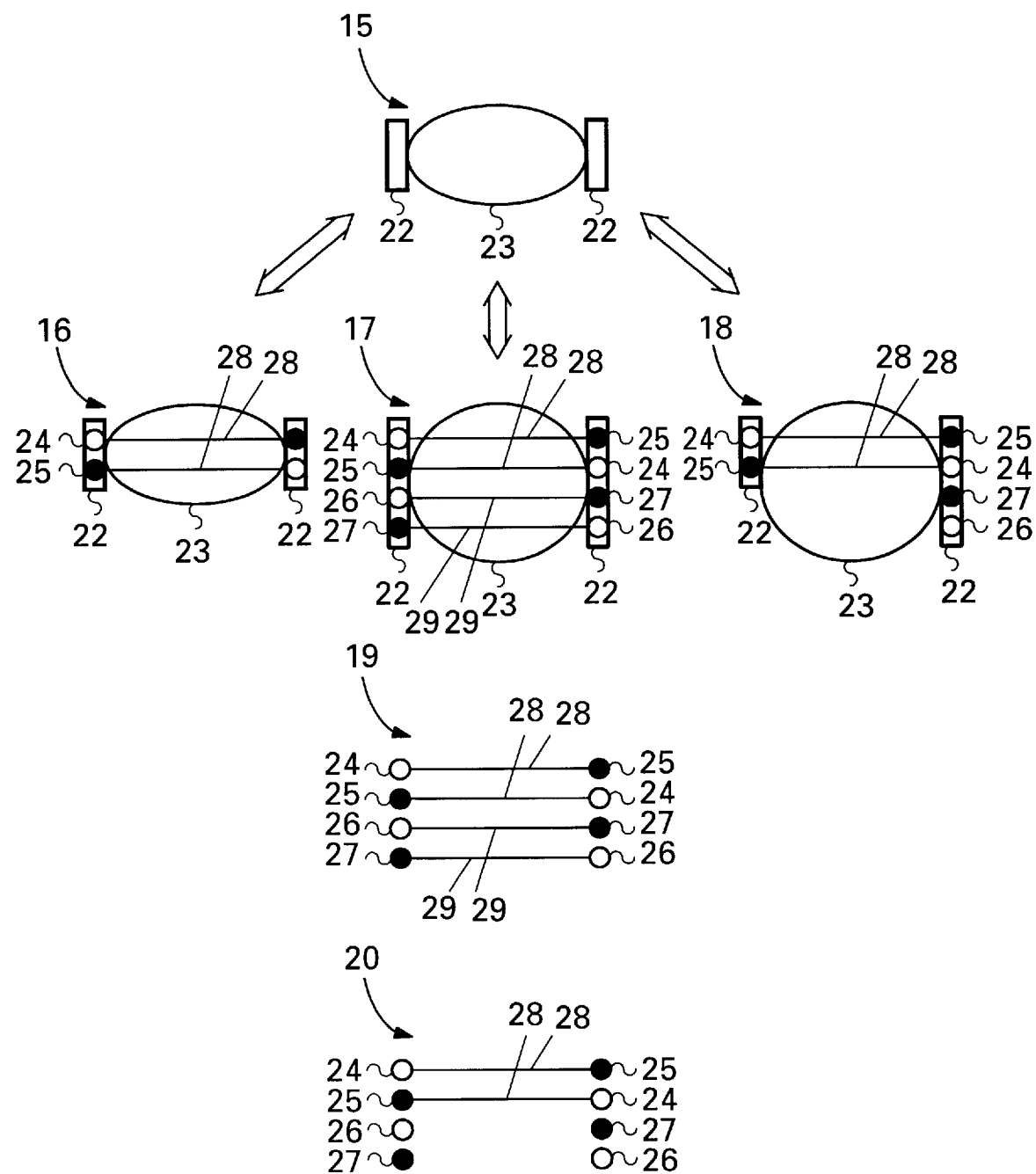
FIG. 3 shows schematically an example of the use of different representations according to the invention.

In FIG. 3 a typical application of the invention is illustrated. A client requests a connection to the server using the abstract representation 15 comprising two ports 22 and a line 23. This representation corresponds with the representation 2 in FIG. 2, having two ports 7 and a line 8. In the abstract representation (15), the client does not need to have exact knowledge of the resources in the terminal involved in the production and consumption of information. From the client's point of view, the port is just an abstract endpoint of a connection, possibly representing for example an ordinary telephone set or an advanced multimedia terminal (with possibly video capabilities). This is the main goal of the abstract representation, i.e. clients do not have to be aware of the exact capabilities of (potentially diverse) end-users' terminal equipment.

Restricting the types of terminals to telephones and multimedia terminals, the aggregate representations corresponding to representation 15 could be either representation 16, 17 or 18, depending on the actual types of the terminals represented by the ports in representation 15.

In representation 16, both ports 22 represent a telephone set. The aggregate representation consists of ports 22, a line 23, audio sources 24, audio sinks 25, and two audio flows 28 between the audio sources and audio sinks.

In representation 17, both ports 22 represent a multimedia terminal. In addition to representation 16, the aggregate representation comprises video sources 26, video sinks 27 and two video flows 29.

In representation 18, one port 22 (on the left-hand side of line 23) represents a telephone set, while the other port 22 (on the right-hand side of line 23) represents a multimedia terminal. In the aggregate representation, only the audio sources (24) and audio sinks (25) are connected by audio flows (28). The video processing capabilities of the multimedia terminal are not connected.

Suppose that representation 17 is the aggregate representation, transparently constructed by the server, corresponding to representation 15. The client switches to the detailed representation 19, in order to cancel the video flows (29), e.g. for cost-saving reasons. The client has to switch to the detailed representation 19, because the release of the video flows cannot be requested using the abstract representation 15. Once the video flows are released, detailed representation 20 results. After these operations on the detailed representation occur, the client switches back to the abstract representation 15.

It will be understood that the representations are shown graphically in FIGS. 2 and 3 for the purpose of illustration of the invention only, and that in an actual implementation of the method the representations may be constituted by suitable data arrays, databases, etc.

Implementations of the method may run in distributed system environments, as described in [3] and [4]. Using these environments, the client is a process in the domain of a service provider, e.g. a multimedia conference provider, a video-on-demand provider, etc. The server is a process in the domain of the communications network provider. The processes in the different domains can communicate by means of a distributed systems environment.

The method described here with reference to the interaction between one or more clients and a server in a communications network is not limited to this particular application, but may also be used to provide suitable representations in interfaces between other components of a communications network or other networks.

The communications network referred to may be a conventional telephone network, but may also be constituted by e.g. a data network, an ISDN network or an intelligent network (IN).

It will be understood by those skilled in the art that the invention is not limited to the examples presented above and that many additions and modifications may be made without departing from the spirit and scope of the present invention.

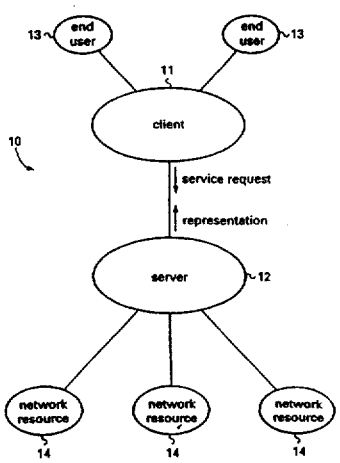

We claim:

1. A method for providing connections in a communications network, each of the connections being established by a server in response to a service request provided by a client, said method comprising the steps of:
   specifying, by the client, in the service request an origin and a destination of a desired one of the connections to be established within the network;
   generating, by the server and in response to the service request, a multiple representation of the desired one connection, the multiple representation comprising first and second single representations, said first and second representations being alternately available to the client, wherein:
      the first representation displays a first group of pre-defined operational attributes of the connection at a first level of detail, wherein the first group of attributes are not modifiable by the client; and
      the second representation displays a second group of pre-defined operational attributes of the connection at a second level of detail, with the first level providing less detail than the second level, and each of the operational attributes in the second group provides additional detail of the connection with respect to a corresponding one of the operational attributes in the first group;
   providing, by the server to the client, the first representation;
   if the client requests additional detail from the server with respect to the desired one connection, providing, by the server to the client, the second representation through which the client can select and modify one of the attributes in the second group so as to modify the second representation; and
   establishing the desired one connection on the basis of said multiple representation as it then exists.

2. The method in claim 1 wherein the first representation comprises, as the first group, ports correspondingly representing the origin and the destination, and lines representing connectivity between the ports.

3. The method in claim 1 wherein the second representation comprises, as the second group, a source representing the origin, a sink representing the destination, and a flow representing connectivity between the source and the sink.

4. The method in claim 1 wherein said first and second representations are obtained through object-oriented programming.

5. A server for use in a communications network, said server being arranged for:
   generating, in response to a service request provided by a client, a multiple representation of a desired connection to be established within the network, the multiple representation comprising first and second single representations, said first and second representations being alternately available to the client, wherein:
      the first representation displays a first group of pre-defined operational attributes of the connection at a first level of detail, wherein the first group of attributes are not modifiable by the client; and
      the second representation displays a second group of pre-defined operational attributes of the connection at a second level of detail, with the first level providing less detail than the second level, and each of the operational attributes in the second group provides additional detail of the connection with respect to a corresponding one of the operational attributes in the first group;
   providing the first representation to the client; and
   if the client requests additional detail from the server with respect to the desired one connection, providing, to the client, the second representation through which the client can select and modify one of the attributes in the second group so as to modify the second representation; and
   establishing the desired one connection on the basis of said multiple representation as it then exists.

6. The server in claim 5 wherein the first representation comprises, as said first group, ports correspondingly representing origins and destinations of the desired connection, and lines representing connectivity between the ports.

7. The server in claim 5 wherein the second representation comprises, as the second group, sources representing origins of the desired connection, sinks representing destinations of the desired connection, and flows representing connectivity between the sources and the sinks.

* * * * *

UNITED STATES PATENT AND TRADEMARK OFFICE
CERTIFICATE OF CORRECTION

PATENT NO. : 5,774,655

DATED : June 30, 1998

INVENTOR(S) : Jacobus Johannes Bloem, et al

It is certified that error appears in the above-identified patent and that said Letters Patent is hereby corrected as shown below:

The title page, showing an incorrect illustrative figure, should be deleted and substitute therefor the attached title page.

Signed and Sealed this

Twenty-seventh Day of October, 1998

*Attest:*

BRUCE LEHMAN

*Attesting Officer*  *Commissioner of Patents and Trademarks*

United States Patent [19]
Bloem et al.

[11] Patent Number: 5,774,655
[45] Date of Patent: Jun. 30, 1998

[54] METHOD AND APPARATUS FOR DISPLAYING MULTIPLE REPRESENTATIONS OF CONNECTIONS IN A COMMUNICATIONS NETWORK WITH DIFFERING LEVELS OF DETAIL

[75] Inventors: Jacobus Johannes Bloem, The Hague; Harrold Bastiaan Korte, Voorschoten, both of Netherlands

[73] Assignee: Koninklijke PTT Nederland N.V., Netherlands

[21] Appl. No.: 852,726

[22] Filed: May 7, 1997

Related U.S. Application Data

[63] Continuation of Ser. No. 504,889, Jul. 20, 1995, abandoned.

[30] Foreign Application Priority Data

Jul. 22, 1994 [EP] European Pat. Off. ............. 94202151

[51] Int. Cl.$^6$ .................................................. H04J 12/00
[52] U.S. Cl. ........................ 395/200.5; 395/200.53; 395/200.57; 395/200.4
[58] Field of Search .................. 340/825.06, 825.17; 364/188; 370/252, 254; 395/335, 356, 183.22, 200.01, 200.1, 200.11, 200.12, 835, 200.5, 200.51, 200.52, 200.53, 200.54, 200.57, 200.58, 2

[56] References Cited

U.S. PATENT DOCUMENTS

| | | | |
|---|---|---|---|
| 5,049,873 | 9/1991 | Robins et al. | 340/825.06 |
| 5,136,690 | 8/1992 | Becker et al. | 395/161 |
| 5,226,120 | 7/1993 | Brown et al. | 395/200.11 |
| 5,261,044 | 11/1993 | Dev et al. | 395/159 |
| 5,276,789 | 1/1994 | Besaw et al. | 395/140 |
| 5,295,244 | 3/1994 | Dev et al. | 395/161 |
| 5,353,399 | 10/1994 | Kuwamoto et al. | 395/159 |
| 5,394,522 | 2/1995 | Sanchez-Frank et al. | 395/349 |
| 5,436,909 | 7/1995 | Dev et al. | 395/182.02 |
| 5,452,415 | 9/1995 | Hotka | 395/161 |
| 5,471,399 | 11/1995 | Tanaka et al. | 364/491 |
| 5,493,568 | 2/1996 | Sampat et al. | 370/60 |
| 5,500,929 | 3/1996 | Dickinson | 395/160 |
| 5,500,934 | 3/1996 | Austin et al. | 395/155 |
| 5,504,921 | 4/1996 | Dev et al. | 395/800 |

FOREIGN PATENT DOCUMENTS

| | | |
|---|---|---|
| 0490624 | 6/1992 | European Pat. Off. . |
| 0499567 | 8/1992 | European Pat. Off. . |
| WO9205485 | 4/1992 | WIPO . |

OTHER PUBLICATIONS

R.J. Cysper, Communications for Cooperating Systems, OSI, SNA, and TCP/IP, Addison–Wesley, pp. 79, 89, 105, 1991.

William Stallings, Local and Metropolitan Area Networks, 4th ed., Prentice Hall, pp. 167, 477, 510. TK 5105.7.s77, 1993.

Feiner, Steven et al. "A Virtum World For Network Management," in Proceedings of 1993 Int'l. Symposium on Virtum Reality, pp. 55–61.

*Primary Examiner*—Lance Leonard Barry, Esq.
*Attorney, Agent, or Firm*—Michaelson & Wallace; Peter L. Michaelson

[57] ABSTRACT

The invention relates to a method of providing connections in a communications network, a connection being set up by a server in response to a service request from a client, the method comprising the steps of providing a representation of a connection corresponding to the respective service request, and of establishing the connection on the basis of the representation. According to the invention the method is characterized in that the representation comprises at least two levels of abstraction. This provides the possibility for the client to choose and manipulate a suitably detailed representation of the connection. Preferably, only the representation having the highest level of abstraction is initially offered to the client, the other representation or representations only being presented upon subsequent client request.

7 Claims, 3 Drawing Sheets